United States Patent
Minagata et al.

(10) Patent No.: US 9,685,650 B2
(45) Date of Patent: *Jun. 20, 2017

(54) ELECTRIC STORAGE DEVICE INCLUDING CURRENT INTERRUPTION DEVICE

(71) Applicant: KABUSHIKI KAISHA TOYOTA JIDOSHOKKI, Kariya-shi, Aichi (JP)

(72) Inventors: Atsushi Minagata, Kariya (JP); Motoaki Okuda, Kariya (JP); Hiroyasu Nishihara, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,002

(22) Filed: Sep. 19, 2016

(65) Prior Publication Data
US 2017/0005320 A1    Jan. 5, 2017

Related U.S. Application Data

(62) Division of application No. 14/415,400, filed as application No. PCT/JP2013/069406 on Jul. 17, 2013.

(30) Foreign Application Priority Data

Jul. 19, 2012   (JP) ................. 2012-160276

(51) Int. Cl.
*H01M 2/34*    (2006.01)
*H01M 2/22*    (2006.01)

(52) U.S. Cl.
CPC ............. *H01M 2/345* (2013.01); *H01M 2/22* (2013.01); *H01M 2200/20* (2013.01)

(58) Field of Classification Search
CPC .................................. H01M 2/345; H01M 2/22
See application file for complete search history.

(56) References Cited

U.S. PATENT DOCUMENTS 5,585,207 A    12/1996    Wakabe et al.
6,136,464 A    10/2000    Wakabe et al.
(Continued)

FOREIGN PATENT DOCUMENTS

JP    07-105932 A    4/1995
JP    07-201372 A    8/1995
(Continued)

OTHER PUBLICATIONS

Communication dated Dec. 8, 2015, from the Japan Patent Office in counterpart application No. 2014-525847.
International Preliminary Report on Patentability dated Jan. 20, 2015 from the International Searching Authority in counterpart application No. PCT/JP2013/069406.
International Search Report for PCT/JP2013/069406 dated Sep. 10, 2013.

*Primary Examiner* — Stewart Fraser
(74) *Attorney, Agent, or Firm* — Sughrue Mion, PLLC

(57) ABSTRACT

An electric storage device comprises the current interruption device which includes a deformable plate electrically connected to a first conductive member and a second conductive member to constitute part of a conductive path. The deformable plate deforms to interrupt the conductive path, when a pressure inside the casing rises. The first conductive member, the second conductive member, and the current interruption device are disposed between the terminal attachment wall and the electrode assembly. The first conductive member extends along the terminal attachment wall to connect the tab and the current interruption device. The second conductive member is connected to the current interruption device at a location that is farther from the terminal attachment wall than a connection between the first conductive member and the current interruption device, and extends along the terminal attachment wall to connect the current interruption device and the electrode terminal.

5 Claims, 7 Drawing Sheets

(56) References Cited

U.S. PATENT DOCUMENTS

| | | |
|---|---|---|
| 6,274,264 B1 | 8/2001 | Azema |
| 6,342,826 B1 | 1/2002 | Quinn et al. |
| 2004/0096732 A1 | 5/2004 | Shin et al. |
| 2008/0038627 A1* | 2/2008 | Yamauchi ............... H01M 2/34 429/53 |
| 2010/0279156 A1 | 11/2010 | Kim et al. |
| 2011/0039136 A1 | 2/2011 | Byun et al. |
| 2011/0052949 A1 | 3/2011 | Byun et al. |
| 2011/0305929 A1 | 12/2011 | Byun |
| 2012/0315515 A1 | 12/2012 | Guen |
| 2013/0095352 A1 | 4/2013 | Yamauchi et al. |
| 2015/0079432 A1 | 3/2015 | Okuda et al. |
| 2015/0207132 A1* | 7/2015 | Minagata ............... H01M 2/22 429/7 |

FOREIGN PATENT DOCUMENTS

| | | |
|---|---|---|
| JP | 07-245090 A | 9/1995 |
| JP | 10-326610 A | 12/1998 |
| JP | 2000-058034 A | 2/2000 |
| JP | 2000-077058 A | 3/2000 |
| JP | 2000-260421 A | 9/2000 |
| JP | 2001-135357 A | 5/2001 |
| JP | 2004-172085 A | 6/2004 |
| JP | 2006-156064 A | 6/2006 |
| JP | 2011-040391 A | 2/2011 |

* cited by examiner

ELECTRIC STORAGE DEVICE INCLUDING CURRENT INTERRUPTION DEVICE

CROSS-REFERENCE TO RELATED APPLICATIONS

This application is a Rule 53(b) Divisional application of U.S. application Ser. No. 14/415,400 filed Jan. 16, 2015, which is a National Stage of International Application No. PCT/JP2013/069406 filed Jul. 17, 2013, claiming priority based on Japanese Unexamined Patent Application No. 2012-160276, filed Jul. 19, 2012, the contents of all of which are incorporated herein by reference in their entirety.

TECHNICAL FIELD

The present invention relates to an electric storage device including a current interruption device.

BACKGROUND ART

Japanese Unexamined Patent Application Publication No. 2000-77058 discloses a battery including a pressure-sensitive current interruption device. In this battery, a tab protruding upward from an electrode assembly, a lead extending substantially linearly in a lateral direction from the tab, and the current interruption device are arranged in series to connect a conductive path between an electrode terminal and the electrode assembly. The current interruption device has a diaphragm portion joined to an upper surface of the lead. In a case where the pressure inside a battery casing rises, the diaphragm portion is inverted upward to be disjoined from the lead, thereby interrupting the conductive path. In an upper part of the battery casing, a space for the diaphragm portion to be inverted is secured.

SUMMARY OF INVENTION

Technical Problem

In Japanese Unexamined Patent Application Publication No. 2000-77058, the space between the electrode assembly lateral to the tab and the lead is a dead space, while the space for the diaphragm portion is provided in the upper part of the battery casing. This dead space makes the battery bulky as a whole.

Solution to Problem

An electric storage device disclosed herein includes: a casing; an electrode assembly accommodated within the casing, the electrode assembly including a positive electrode and a negative electrode; an electrode terminal provided on a terminal attachment wall of the casing; a first conductive member accommodated within the casing and electrically connected to the electrode assembly; a second conductive member accommodated within the casing and electrically connected to the electrode terminal; and a current interruption device accommodated within the casing, connected in series between the first conductive member and the second conductive member, and configured to connect or interrupt a conductive path from the electrode assembly to the electrode terminal. The electrode assembly has a tab protruding from at least one of the positive electrode and the negative electrode toward the terminal attachment wall. The current interruption device includes a deformable plate electrically connected to the first conductive member and the second conductive member to constitute part of the conductive path. The deformable plate has a joint part that forms a joint with a joint receiving member to connect the conductive path, the deformable plate being configured to, when a pressure inside the casing rises, deform to be separated from the joint receiving member to interrupt the conductive path, the joint receiving member being either the first conductive member or the second conductive member. The first conductive member, the second conductive member, and the current interruption device are disposed between the terminal attachment wall and the electrode assembly. The first conductive member extends along the terminal attachment wall to connect the tab and the current interruption device. The second conductive member is connected to the current interruption device at a location that is farther from the terminal attachment wall than a connection between the first conductive member and the current interruption device, and extends along the terminal attachment wall to connect the current interruption device and the electrode terminal.

In the electric storage device, the first conductive member extends along the terminal attachment wall to connect the tab and the current interruption device. The second conductive member extends along the terminal attachment wall at a location that is farther from the terminal attachment wall than a connection between the first conductive member and the current interruption device, and is connected to the current interruption device at a location that is farther from the terminal attachment wall than the first conductive member, and connects the current interruption device and the electrode terminal. By the above, the current interruption device is installed in a space formed between the terminal attachment wall and the electrode assembly by the tab protruding toward the terminal attachment wall, the electric storage device is miniaturized.

In the electric storage device, the tab and the current interruption device may at least partially overlap each other in a direction in which the first conductive member extends.

In the electric storage device, the first conductive member may linearly extend along the terminal attachment wall. Further, the second conductive member may linearly extend along the terminal attachment wall.

In the electric storage device, the joint receiving member (which is either the first conductive member or the second conductive member) may have an engraved portion in an area around a part thereof that forms a joint with the joint part of the invertible plate, and when the deformable plate deforms, the joint receiving member may break at the engraved portion.

In the electric storage device, the deformable plate may be an invertible plate.

In the electric storage device, the terminal attachment wall of the casing may be provided with a plate-like insulating member that is in contact with an inner surface of the terminal attachment wall in parallel to the inner surface.

In the electric storage device, the tab may be bent in a direction substantially parallel to the terminal attachment wall so that a flat part that is substantially parallel to the terminal attachment wall is formed, and the first conductive member may be joined to a surface of the flat part that faces the terminal attachment wall of the casing.

In the electric storage device, the first conductive member and the second conductive member may extend in opposite directions to each other.

In the electric storage device, the electric storage device may be a secondary battery.

The advantage of the present invention is that an electric storage device including a current interruption device is miniaturized.

DESCRIPTION OF EMBODIMENTS

Figure 1:
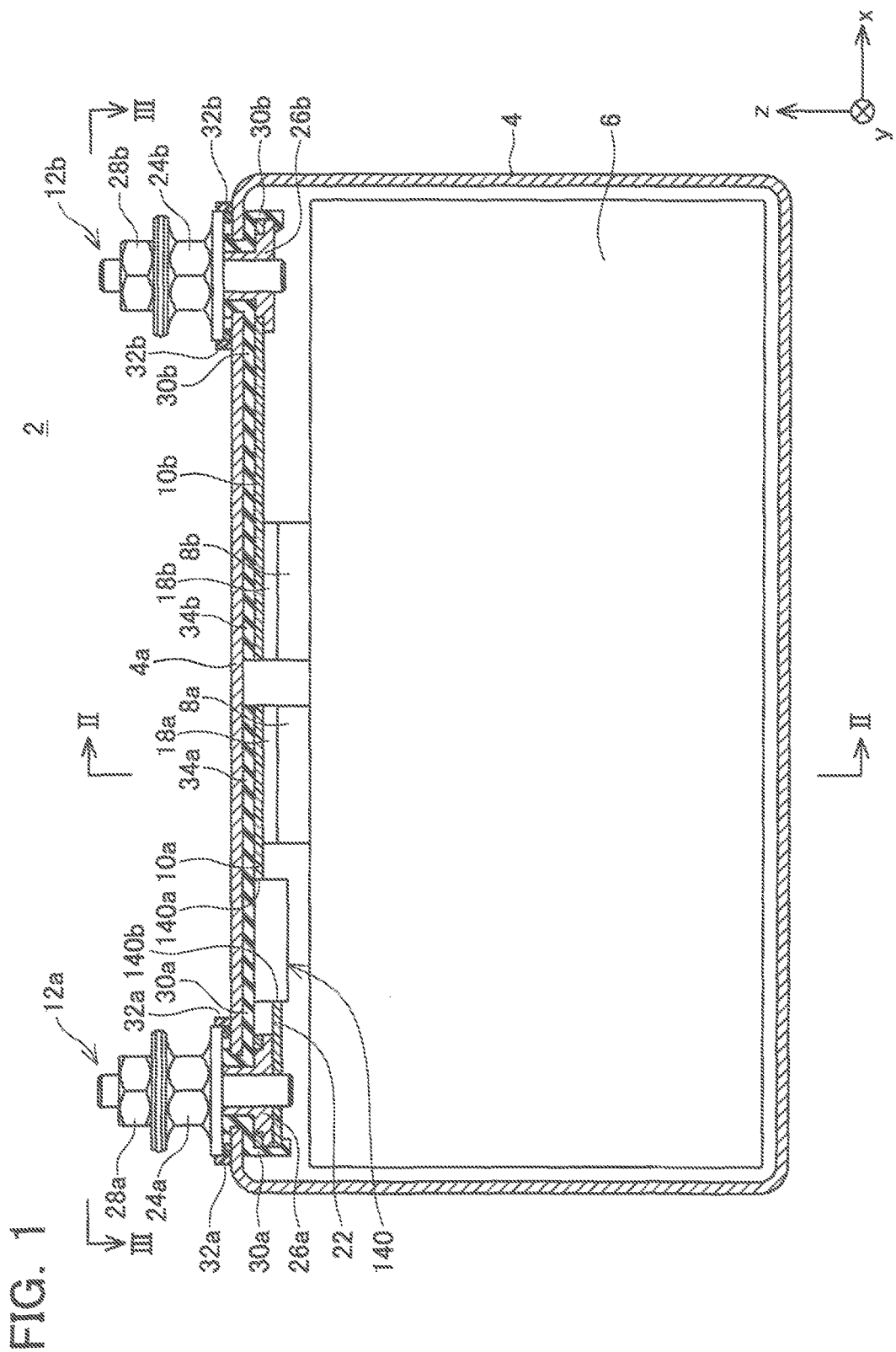
FIG. 1 is a longitudinal sectional view of an electric storage device according to a first Embodiment.

A current interruption device disclosed herein is used in a conventionally publicly-known electric storage device such as a sealed secondary battery or a sealed capacitor. Furthermore, specific examples of secondary batteries include lithium-ion batteries, nickel-hydrogen batteries, nickel-cadmium batteries, lead storage batteries, and the like. In these secondary batteries, comparatively high-capacity and large-current charge and discharge are carried out. Further, this electric storage device may be mounted in a vehicle, an electric device, or the like.

An electric storage device disclosed herein includes: a casing; an electrode assembly accommodated within the casing; a first conductive member accommodated within the casing; a second conductive member accommodated within the casing; a current interruption device accommodated within the casing; and an electrode terminal provided on a terminal attachment wall of the casing. The electrode assembly includes a positive electrode and a negative electrode, and has a tab protruding from at least either the positive electrode or the negative electrode toward the terminal attachment wall. The first conductive member is electrically connected to the electrode assembly, and the second conductive member is electrically connected to the electrode terminal. The current interruption device is connected in series between the first conductive member and the second conductive member.

An example of the electrode assembly is an electrode assembly including an electrode pair in which a sheet-like positive electrode and a sheet-like negative electrode are layered with a sheet-like separator sandwiched therebetween. More specific examples of the electrode assembly are a stacked type electrode assembly having a large number of these electrode pairs stacked on top of each other and a wound type electrode assembly in which this electrode pair is wound around a predetermined axis. The electrode assembly may be impregnated with an electrolyte.

On the side on which the current interruption device is placed, the conductive member from the positive electrode or negative electrode of the electrode assembly to the corresponding electrode terminal (which is either the positive electrode terminal or the negative electrode terminal) is electrically connected via the tab, the first conductive path, the current interruption device, and the second conductive member, which are connected in series in this order. The current interruption device constitutes part of the conductive path from the electrode assembly to the electrode terminal, and is configured to connect or interrupt the conductive path. The current interruption device may be placed on either the positive electrode side or the negative electrode side or on both the positive electrode side and the negative electrode side.

The current interruption device includes a deformable plate electrically connected to the first conductive member and the second conductive member to constitute part of the conductive path. The deformable plate has a joint part that forms a joint with a joint receiving member (which is either the first conductive member or the second conductive member) to connect the conductive path. For example, the deformable plate may be always electrically connected to either the first conductive member or the second conductive member and electrically connected to the other conductive member by the joint part to interrupt conduction at the joint part as needed. Alternatively, the deformable plate may be formed integrally with either the first conductive member or the second conductive member, and the other conductive member may serve as a joint receiving member to form a joint with the deformable plate at the joint part. It is preferable that the deformable plate and the joint receiving member be electrically connectably fixed by welding or the like at the joint part.

When the pressure inside the casing rises, the deformable plate deforms to be separated from the joint receiving member to interrupt the conductive path. An example of a structure of the deformable plate is a diaphragm structure. The deformable plate may be a pressure-sensitive member that deforms in a casing where the pressure inside the casing rises and the difference between the pressure on one surface of the deformable plate and the pressure on the other surface of the deformable plate takes on a value that is equal to or larger than the predetermined value, or may be one that deforms under a load applied by another pressure-sensitive member that operates when the pressure inside the casing rises. The pressure-sensitive member that applies a load to the deformable plate that forms a joint with the joint receiving member may be similar in structure to the deformable plate. The deformable plate that is additionally provided to apply a load is not a component essential to the electric storage device disclosed herein, and does not need to be electrically connected to the conductive path.

When the pressure inside the casing rises and the deformable plate deforms, the deformable plate and the joint receiving member may be separated from each other at the joint part, for example, by detachment of the weld at the joint part. Alternatively, for example, by breakage of the joint receiving member in an area around the joint part, the deformable plate and the joint receiving member may be separated from each other with the joint maintained at the joint part. In order to cause the joint receiving member to be broken, a component such as an engraved mark that facilitates breakage may be formed in the joint receiving member in an area around the joint part. In a case where the conductive path is interrupted by breaking the joint receiving member, the breaking load is easily adjusted and the current interruption device is activated more accurately in response to the desired pressure inside the casing.

In the electric storage device disclosed herein, the first conductive member, the second conductive member, and the current interruption device are disposed between the terminal attachment wall and the electrode assembly. The first conductive member extends along the terminal attachment wall, and connects the tab and the current interruption device at a location that is closer to the terminal attachment wall than the second conductive member. The second conductive member is connected to the current interruption device at a location that is farther from the terminal attachment wall than a connection between the first conductive member and the current interruption device, extends along the terminal attachment wall, and connects the current interruption device and the electrode terminal.

In Japanese Unexamined Patent Application Publication No. 2000-77058, the lead (conductive member) connected to the tab is disposed in the lower part (on the electrode assembly side) of the current interruption device. An attempt to shift the current interruption device downward to place it in a space between the tab and the upper surface (terminal attachment wall) of the casing makes it necessary to cause the lead connected to the tab to be greatly bent from the upper end side of the tab to the lower part of the current interruption device.

In the electric storage device disclosed herein, the first conductive member connected to the tab is connected to a further upper part of the current interruption device (on the terminal attachment wall side of the casing); therefore, the current interruption device is placed between the terminal attachment wall and the electrode assembly without greatly bending the first conductive member. Further, normally, the electrode terminal protrudes into a lower position than the terminal attachment wall of the casing and extends to a lower position than the upper end of the tab; therefore, even when the second conductive member connected to the electrode terminal is connected to the current interruption device in a lower position than the connection between the first conductive member and the current interruption device, the second conductive member does not need to be greatly bent. That is, the omission of a space for the first conductive member and the second conductive member to be greatly bent, too, contribute to miniaturization of the electric storage device. Further, since the first conductive member and the second conductive member is made smaller than they are in a case where they are greatly bent, the cost of the electric storage device is reduced.

Further, since, unlike in Japanese Unexamined Patent Application Publication No. 2000-77058, the terminal attachment wall does not need to have an outward protruding portion within which the current interruption device is disposed, the degree of freedom of connection of an external wire to the electrode terminal is improved.

In the electric storage device, the tab and the current interruption device may at least partially overlap each other in a direction in which the first conductive member extends. Thus, the dead space of the electric storage device becomes smaller, and the electric storage device is further miniaturized.

The first conductive member and the second conductive member only need to extend along the terminal attachment wall, and do not need to linearly extend parallel to the terminal attachment wall. However, the electric storage device disclosed herein is configured such that the first conductive member and the second conductive member are flatter. The electric storage device disclosed herein is also designed such that the first conductive member linearly extends along the terminal attachment wall, and is also designed such that the second conductive member linearly extends along the terminal attachment wall. In a case where the first conductive member and the second conductive member are linear, they are easily processed, and a contribution to cost reduction and higher accuracy of the members is made.

In the electric storage device, the terminal attachment wall of the casing is provided with a plate-like insulating member that is in contact with an inner surface of the terminal attachment wall in parallel to the inner surface. Thus, the current interruption device and the tab become as close as possible to the end face of the casing while ensuring insulation properties against the casing, and the distance between the terminal attachment wall of the casing and the electrode assembly is further shortened and the size of the electric storage device is further reduced. Furthermore, the first conductive member may be disposed in such a state as to be in contact with the plate-like insulating member. Thus, the current interruption device and the tab are prevented from vibrating with respect to the casing.

In the electric storage device, the tab may be bent in a direction substantially parallel to the terminal attachment wall so that a flat part that is substantially parallel to the terminal attachment wall is formed, and the first conductive member may be joined to a surface of the flat part that faces the terminal attachment wall. By joining the tab and the first conductive member with the flat part of the tab, the distance between the end face of the casing to which the electrode terminal is attached and the electrode assembly is made shorter than it is in a case where the tab extends straight. By the above, the size of the electric storage device is reduced.

(Embodiment 1)

FIG. 1 is a sectional view of an electric storage device 2 according to Embodiment 1. The electric storage device 2 includes a casing 4, an electrode assembly 6, a first conductive member 10*a*, a second conductive member 22, a third conductive member 10*b*, a positive electrode terminal 12*a*, a negative electrode terminal 12*b*, insulating members 34*a* and 34*b*, and a current interruption device 140.

The electrode assembly 6 includes a sheet-like positive electrode, a sheet-like negative electrode, and a sheet-like separator sandwiched between the positive electrode and the negative electrode to separate them from each other. The positive electrode includes a positive electrode active material and a positive electrode metal foil, and the negative electrode includes a negative electrode active material and a negative electrode metal foil. The electrode assembly 6 is a stacked body in which the positive electrode and the negative electrode are stacked alternately in layers with the separator sandwiched therebetween, and is impregnated with a liquid electrolyte. A tab 8*a* extends from the positive electrode metal foil of the electrode assembly 6, and a tab 8*b* extends from the negative electrode metal foil of the electrode assembly 6.

The casing 4 is a box-shaped member that is substantially cubic in shape. Within the casing 4, the electrode assembly 6 (including the tabs 8*a* and 8*b*), the first conductive member 10*a*, the second conductive member 22, the third conductive member 10*b*, the current interruption device 140, and insulating members 34*a* and 34*b* are disposed. On a terminal attachment wall 4*a* (i.e. a wall positioned in the positive direction of the z-axis) of the casing 4, the positive electrode terminal 12a and the negative electrode terminal 12b are provided. The positive electrode terminal 12a and the negative electrode terminal 12b are provided at both ends of the terminal attachment wall 4a in the direction of the x-axis, and the tabs 8a and 8b are provided in the central part of the electrode assembly in the direction of the x-axis. Tabs 8a protruding from ends of a plurality of positive electrode metal foils of the electrode assembly 6 are bundled, and similarly, tabs 8b protruding from ends of a plurality of negative electrode metal foils of the electrode assembly 6 are bundled. The electrode assembly 6 is covered with an insulating film, and protrudes from the insulating film in parts thereof that are connected to the tabs 8a and 8b.

Figure 2:
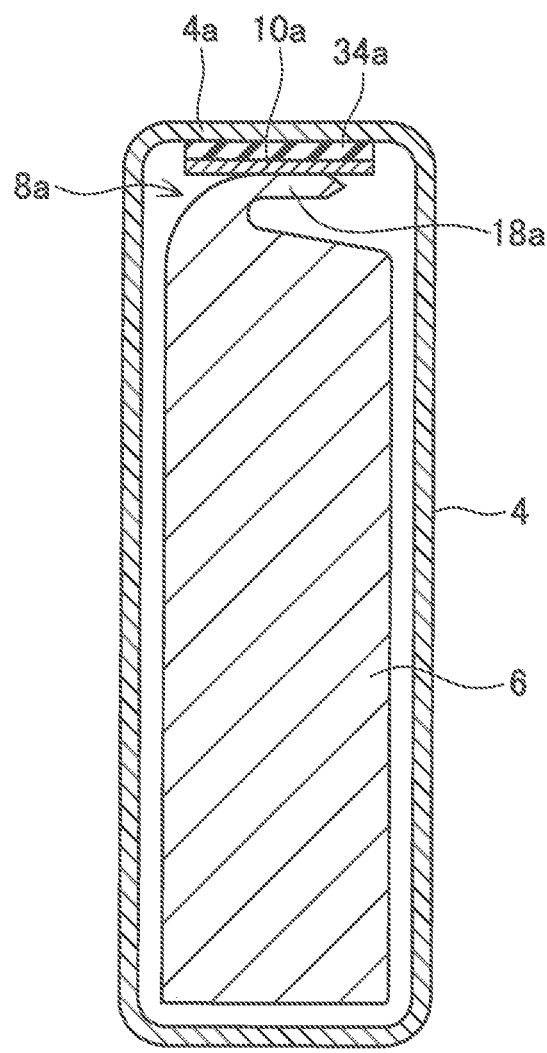
FIG. 2 is a cross-sectional view taken along the line II-II of FIG. 1.

As shown in FIG. 2, the tab 8a is formed in a shape that extends in the positive direction of the z-axis from the electrode assembly 6 toward the terminal attachment wall 4a of the casing 4 and bends halfway in the negative direction of the y-axis to have a flat part 18a that is substantially parallel to the terminal attachment wall 4a of the casing 4. Similarly, the tab 8b is formed in a shape that extends in the positive direction of the z-axis from the electrode assembly 6 toward the terminal attachment wall 4a of the casing 4 and bends halfway in the negative direction of the y-axis to have a flat part 18b that is substantially parallel to the terminal attachment wall 4a of the casing 4.

As shown in FIG. 1, the first conductive member 10a and the second conductive member 22 are plate-like conductive members. The first conductive member 10a linearly extends in the direction of the x-axis that is substantially parallel to the terminal attachment wall 4a of the casing 4. The second conductive member 22 is disposed in a location that is farther from the terminal attachment wall 4a of the casing 4 than the first conductive member 10a in the direction of the z-axis, and linearly extends in the direction of the x-axis that is substantially parallel to the terminal attachment wall 4a of the casing 4. As shown in FIG. 2, a lower surface of the first conductive member 10a (i.e. a surface of the first conductive member 10a that faces the electrode assembly 6) and an upper surface of the flat part 18a of the tab 8a (i.e. a surface of the flat part 18a that faces the terminal attachment wall 4a) are in contact with each other, and fixed to each other by welding.

As shown in FIG. 1, the third conductive member 10b is a plate-like conductive member. The third conductive member 10b linearly extends in the direction of the x-axis that is substantially parallel to the terminal attachment wall 4a of the casing 4. A lower surface of the third conductive member 10b and an upper surface of the flat part 18b of the tab 8b are in contact with each other, and are fixed to each other by welding.

The positive electrode terminal 12a includes a bolt 24a, an inner nut 26a, and an outer nut 28a. The terminal attachment wall 4a of the casing 4 has a through-hole formed in a place therein where the positive electrode terminal 12a is disposed, with an insulating gasket 30a fitted in the through-hole. The inner nut 26a passes through a through-hole formed in the second conductive member 22, and is fitted in the gasket 30a. The bolt 24a is fastened to the inner nut 26a via a seal washer 32a. The second conductive member 22 is held between the inner nut 26a and the gasket 30a. The gasket 30a is formed integrally with the insulating member 34a, which is in the shape of a flat plate that extends parallel to an inner surface of the terminal attachment wall 4a of the casing 4 while in contact with the inner surface of the terminal attachment wall 4a. An upper surface of the first conductive member 10a and an upper surface of the second conductive member 22 are in contact with the insulating member 34a. The outer nut 28a of the positive electrode terminal 12a is used for wire connection between the positive electrode terminal 12a and a wiring member.

The negative electrode terminal 12b includes a bolt 24b, an inner nut 26b, and an outer nut 28b. The terminal attachment wall 4a of the casing 4 has a through-hole formed in a place therein where the negative electrode terminal 12b is disposed, with an insulating gasket 30b fitted in the through-hole. The inner nut 26b passes through a through-hole formed in the third conductive member 10b, and is fitted in the gasket 30b. The bolt 24b is fastened to the inner nut 26b via a seal washer 32b. The third conductive member 10b is held between the inner nut 26b and the gasket 30b. The gasket 30b is formed integrally with the insulating member 34b, which is in the shape of a flat plate that extends parallel to the inner surface of the terminal attachment wall 4a of the casing 4 while in contact with the inner surface of the terminal attachment wall 4a. An upper surface of the third conductive member 10b is in contact with the insulating member 34b. The outer nut 28b of the negative electrode terminal 12b is used for wire connection between the negative electrode terminal 12b and a wiring member.

Figure 3:
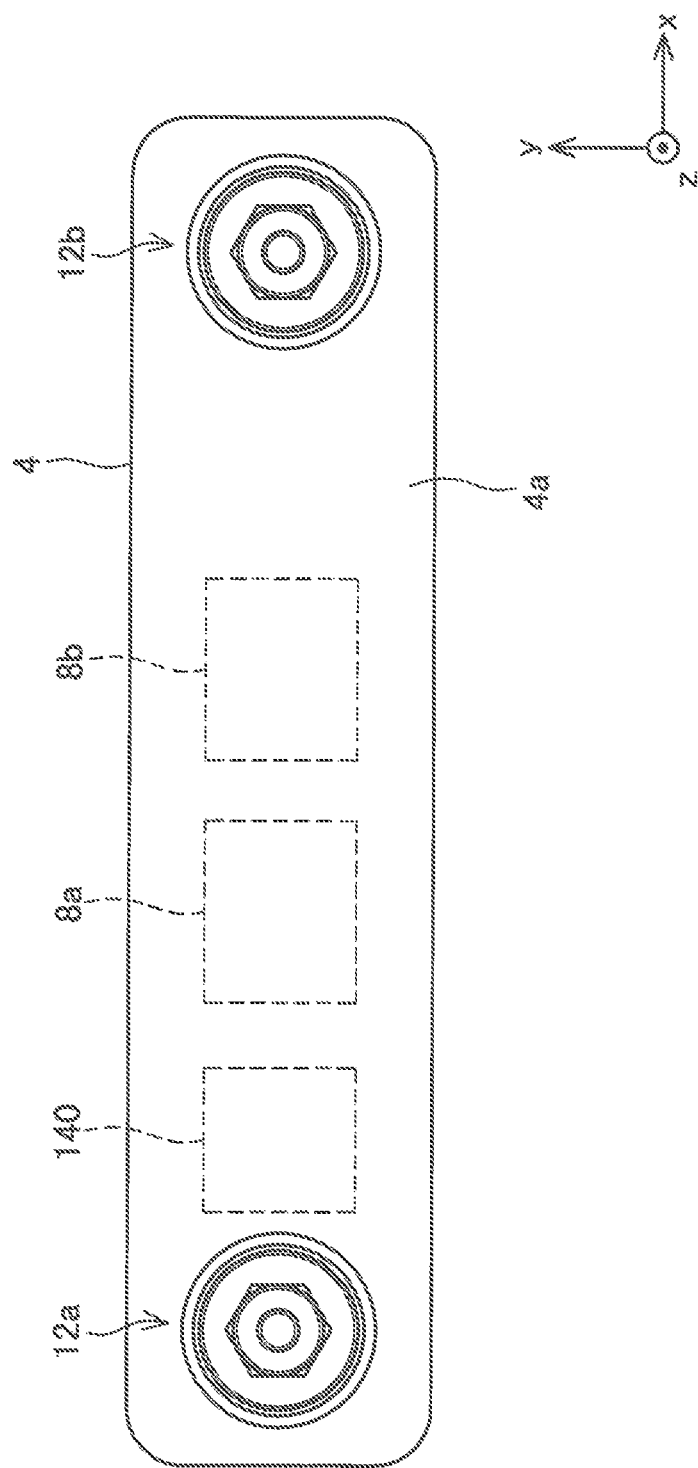
FIG. 3 is a plan view of the electric storage device as seen from the line III-III of FIG. 1.

As shown in FIG. 1, the first conductive member 10a and the second conductive member 22 are connected to each other via the current interruption device 140. The first conductive member 10a and the current interruption device 140 are connected to each other at a connection 140a, and the second conductive member 22 and the current interruption device 140 are connected to each other at a connection 140b located farther from the terminal attachment wall 4a than the connection 140a. A positive electrode side conductive path from the positive electrode to the positive electrode terminal 12a is connected by the tab 8a, the first conductive member 10a, the current interruption device 140, and the second conductive member 22, which are connected in series in this order. As shown in FIG. 3, the positive electrode terminal 12a, the current interruption device 140, the tabs 8a and 8b, and the negative electrode terminal 12b are disposed in such a manner as to overlap one another in the direction of the x-axis in which the first conductive member 10a extends.

Figure 4:
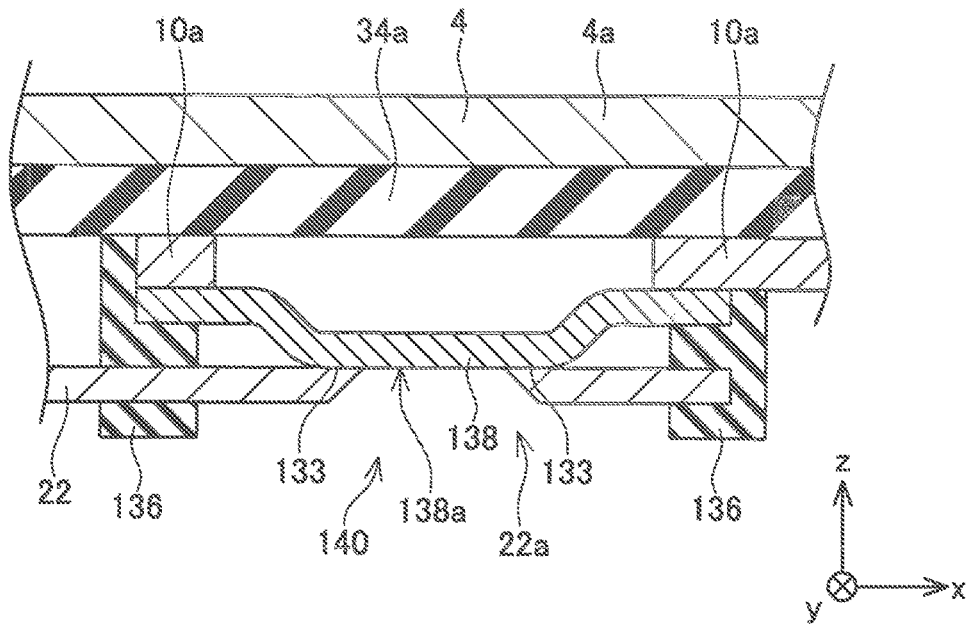
FIG. 4 is a diagram showing a current interruption device of FIG. 1 and its vicinity in a state where the electric storage device is normally operating.
Figure 5:
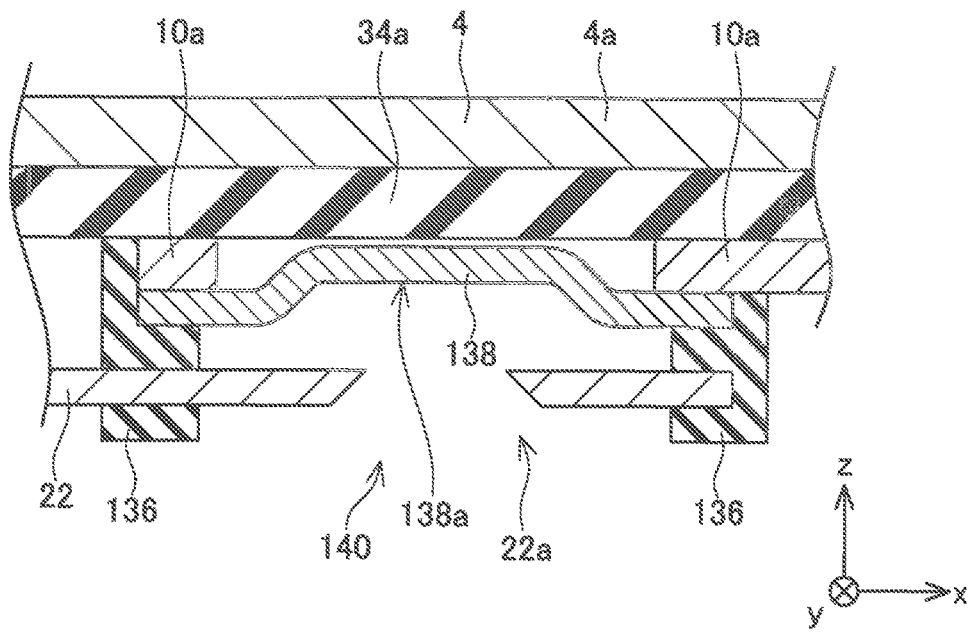
FIG. 5 is a diagram showing the current interruption device of FIG. 1 and the area therearound in a state where the electric storage device is overcharged.

As shown in FIG. 4, the current interruption device 140 includes: an insulating bracket 136 configured to mechanically fix an end of the first conductive member 10a in the negative direction of the x-axis and an end of the second conductive member 22 in the positive direction of the x-axis; and an invertible plate 138 configured to serve as a conducting deformable plate that is supported in the bracket 136 while in contact with the second conductive member 22. The invertible plate 138 is a diaphragm. In a case where the pressure inside the casing 4 takes on a value that is smaller than a predetermined value, the invertible plate 138 is in such a state as to be bulging in the negative direction of the z-axis as shown in FIG. 4, and when the pressure inside the casing 4 takes on a value that is equal to or larger than the predetermined value, the invertible plate 138 is in such a state as to be bulging in the positive direction of the z-axis as shown in FIG. 5. When the invertible plate 138 is in such a state as to be bulging in the negative direction of the z-axis as shown in FIG. 4, a portion 138a of the invertible plate 138 that is bulging in the negative direction of the z-axis is in contact with the edge of an opening 22a formed in the second conductive member 22, and is fixed to a joint part 133 by welding. The first conductive member 10a and the second conductive member 22 electrically conduct with each other via the invertible plate 138. When the invertible plate 138 comes into such a state as to be bulging in the positive direction of the z-axis as shown in FIG. 5, the joint part 133 is detached so that the invertible plate 138 is separated from the second conductive member 22, with the result that the first conductive member 10a and the second conductive member 22 are electrically disconnected from each other. The second conductive member 22 has the opening 22a formed therein so that when the invertible plate 138 is in such a state as to be bulging in the negative direction of the z-axis, so that the second conductive member 22 does not interfere with the bulging portion 138a of the invertible plate 138. A lower surface of the bulging portion 138a of the invertible plate 138 is subjected to the pressure from an electrode assembly 6 side of the casing 4. When the pressure inside the casing 4 takes on a value that is equal to or larger than the predetermined value, the difference between the pressure on the lower surface of the bulging portion 138a of the invertible plate 138 and the pressure on an upper surface of the bulging portion 138a of the invertible plate 138 takes on a value that is equal to or larger than the predetermined value, with the result that the invertible plate 138 is inverted. This causes the joint part 133 to be detached so that the invertible plate 138 is separated from the second conductive member 22, with the result that the conductive path is interrupted.

As described above, in the electric storage device 2, the first conductive member 10a extends in the direction of the x-axis along the terminal attachment wall 4a at a location that is closer to the terminal attachment wall 4a than the second conductive member 22 in the direction of the z-axis, and connects the tab 8a and the current interruption device 140 at the connection 140a that is closer to the terminal attachment wall 4a than the second conductive member 22 in the direction of the z-axis. Further, the second conductive member 22 extends in the direction of the x-axis along the terminal attachment wall 4a at a location that is farther from the terminal attachment wall 4a than the first conductive member 10a in the direction of the z-axis, and connects the current interruption device 140 and the positive electrode terminal 12a at the connection 140b that is farther from the terminal attachment wall 4a than the connection 140a in the direction of the z-axis. By the above, the current interruption device 140 is installed in a space formed between the terminal attachment wall 4a and the electrode assembly 6 by the tab 8a protruding toward the terminal attachment wall 4a, the size of the electric storage device 2 is reduced. Furthermore, the omission of a space for the first conductive member 10a and the second conductive member 22 to be greatly bent, too, contribute to a reduction in size of the electric storage device 2. Further, since the first conductive member 10a and the second conductive member 22 is made smaller than they are in a case where they are greatly bent, the cost of the electric storage device is reduced. Further, since the terminal attachment wall 4a does not need to have an outward protruding portion within which the current interruption device is disposed, the degree of freedom of connection of wires to the positive electrode terminal 12a and the negative electrode terminal 12b is improved.

Further, the tabs 8a and 8b and the current interruption device 140 at least partially overlap each other in the direction of the x-axis in which the first conductive member 10a extends. Thus, the dead space in the casing 4 is reduced, and the size of the electric storage device 2 in the direction of the z-axis is reduced.

Further, the first conductive member 10a and the second conductive member 22 linearly extend parallel to the terminal attachment wall 4a. By the above, the first conductive member 10a and the second conductive member 22 easily processed, excellent in cost performance, and high in processing accuracy.

Further, the electric storage device 2 is provided with the plate-like insulating members 34a and 34b that are in contact with an inner surface of the terminal attachment wall 4a of the casing 4 in parallel to the inner surface. Thus, the distance between the terminal attachment wall 4a of the casing 4 and the electrode assembly 6 is shortened by bringing the current interruption device 140 and the tabs 8a and 8b as close as possible to the terminal attachment wall 4a of the casing 4 while ensuring insulation properties against the casing 4, and the size of the electric storage device 2 is further reduced. Furthermore, since the first conductive member 10a is disposed in such a state as to be in contact with the plate-like insulating member 34a, the first conductive member 10a prevent the current interruption device 140 and the tab 8a from vibrating with respect to the casing 4.

Further, the tabs 8a and 8b are bent in the direction of the y-axis that is substantially parallel to the terminal attachment wall 4a, so that the flat parts 18a and 18b that are substantially parallel to the terminal attachment wall 4a. By the above configuration, the size of the electric storage device 2 in the vertical direction (direction of the z-axis) is reduced in comparison with a case where the tabs 8a and 8b extend straight.

Further, when seen in plan view from the terminal attachment wall 4a of the casing 4, the positive electrode terminal 12a, the current interruption device 140, and the tab 8 appear to be disposed offset from one another, and the positive electrode terminal 12a, the current interruption device 140, and the tab 8 overlap one another in the direction of the x-axis in which the first conductive member 10a extends. Further, in the electric storage device 2 of the present embodiment, an upper end of the tab 8a is disposed at a location that is closer to the terminal attachment wall 4a of the casing 4 than a lower end of the current interruption device 140. By the above configuration, a space lateral to the positive electrode terminal 12a and a space lateral to the current interruption device 140 are effectively utilized, although these spaces have conventionally been dead spaces. By the above configuration, the size of the electric storage device 2 in the vertical direction is also reduced.

(Modification)

The embodiment has been described by taking, as an example, a case where the casing is a box-shaped member that is substantially cubic in shape. However, the casing may be a box-shaped member that is substantially cylindrical in shape.

Further, although, in the embodiment described above, a case has been described where the first conductive member 10a is sandwiched between the flat part 18a of the tab 8a and the insulating member 34a, a configuration other than this is alternatively adopted. For example, the flat part 18a may be in contact with the insulating member 34a, and the first conductive member 10a may be in contact with a lower side of the flat part 18a. Alternatively, the flat part 18a may be in contact with the insulating member 34a, and the first conductive member 10a may be inserted into the flat part 18a. The same applies to the relationship between the tab 8b, the third conductive member 10b, and the insulating member 34b.

Figure 6:
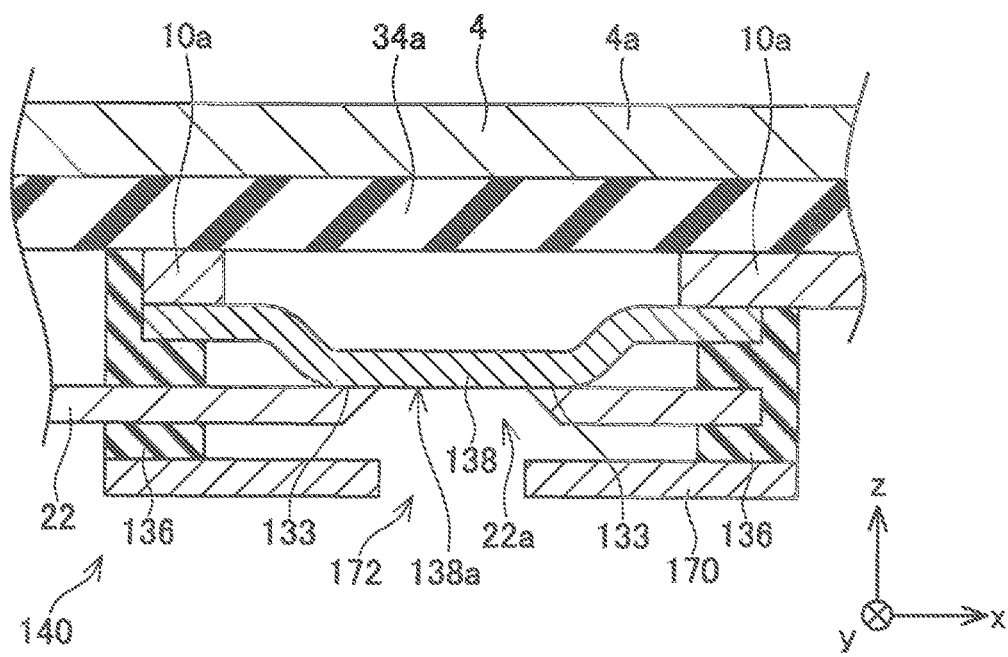
FIG. 6 is a diagram showing a current interruption device according to a modification and its vicinity in a state where the electric storage device is normally operating.

Alternatively, such a current interruption device 240 as that shown in FIG. 6 may be used instead of the current interruption device 140. The current interruption device 240 differs from the current interruption device 140 in that the current interruption device 240 includes a protective plate 170. The other components of the current interruption device 240 are identical to those of the current interruption device 140, and as such, are given the same reference numerals and are not described below. As shown in FIG. 6, the current interruption device 240 has an insulating protective plate 170 provided below the invertible plate 138. The protective plate 170 is fixed to a lower surface of the insulating bracket. The protective plate 170 is disposed between the invertible plate 138 and the electrode assembly 6 (see FIG. 1). Therefore, even if the electrode assembly 6 makes contact with the current interruption device 240, the invertible plate 138 is prevented from malfunctioning. When the pressure inside the casing 4 is lower than a predetermined level (e.g. when the pressure inside the casing 4 is normal), the conductive path between the electrode assembly 6 and the negative electrode terminal 12b is prevented from being interrupted. Further, since the protective plate 170 has insulation properties, the protective plate 170 prevent the invertible plate 138 and the electrode assembly 6 from making contact with each other to form a short circuit. The protective plate 170 is provided with a through-hole 172. This prevents pressure from being applied to the portion 138a of the invertible plate 138 when the pressure inside the casing 4 rises beyond the predetermined level.

Further, in the embodiments described above, the current interruption devices 140 and 240 are each configured such that one surface of the invertible plate having the joint part is subjected to the pressure inside the casing and the invertible plate is inverted when the pressure inside the casing rises and the difference between the pressure on one surface of the invertible plate and the pressure on the other surface of the invertible plate takes on a value that is equal to or larger than the predetermined value. However, the current interruption devices 140 and 240 are not limited to this configuration. For example, as in the case of a current interruption device 340 described below with reference to FIGS. 7 and 8, a first invertible plate 330 (which is an example of a deformable plate) having a joint part 333 may be inverted under a load from a second invertible plate 342 (which is an example of a deformable plate) that is inverted when the pressure inside the casing rises. Further, the joint receiving member (which is either the first conductive member or the second conductive member) that forms a joint with the invertible plate at the joint part may be one that is not broken but is detached from the invertible plate at the time of current interruption. In the description of the modification below with reference of FIGS. 7 and 8, only parts different from those of the electric storage device 2 of Embodiment 1 are described, and components identical to those of the electric storage device 2 are not repeatedly described.

Figure 7:
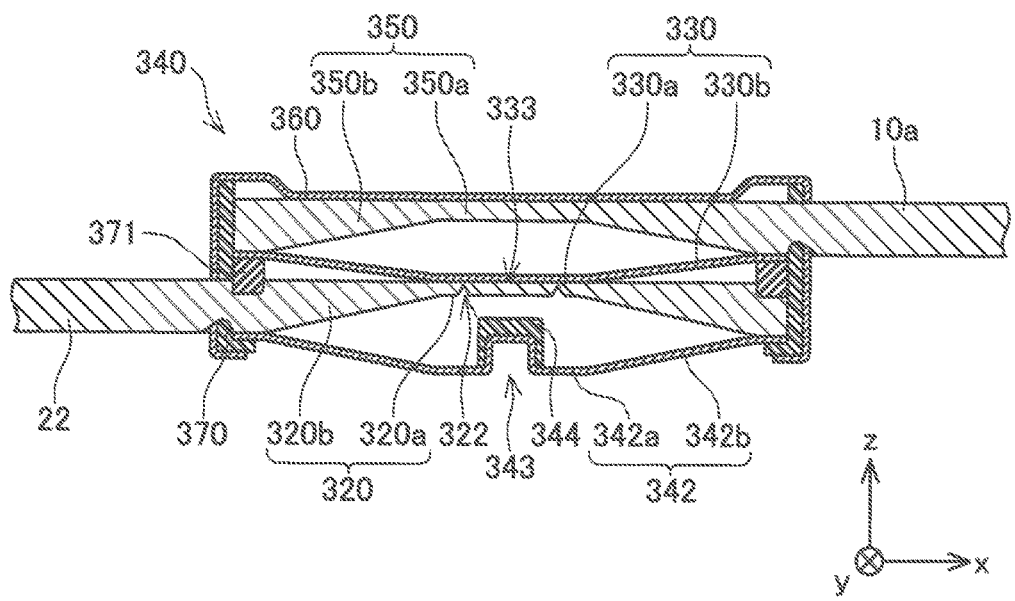
FIG. 7 is a diagram showing a current interruption device according to the modification and in a state where the electric storage device is normally operating.

As shown in FIG. 7, the current interruption device 340 includes the first invertible plate 330, the second invertible plate 342, supporting members 360 and 370, and an O-ring 371. Inserted in the current interruption device 340 are an inner portion 350 and an inner portion 320. The inner portion 350 is an end of the first conductive member 10a that faces the positive electrode terminal 12a (shown in FIG. 1, in the negative direction of the x-axis), and the inner portion 320 is an end of the second conductive member 22 that faces the tab 8a (shown in FIG. 1, in the positive direction of the x-axis). In the direction from the positive electrode terminal 12a toward the electrode assembly 6 (i.e. in the negative direction of the z-axis), the inner portion 350, the first invertible plate 330, the inner portion 320, and the second conductive member 342 are arranged in this order. The first invertible plate 330 is disposed within the current interruption device 340, and a lower surface of the second invertible plate 342 (i.e. a surface of the second invertible plate 342 that faces in the negative direction of the z-axis) is subjected to the pressure from the electrode assembly 6 side of the casing 4. The O-ring 371 is held between the first invertible plate 330 and the inner portion 320.

The supporting member 360 and the terminal attachment wall 4a of the casing 4 are electrically insulated from each other by the insulating member 34a. The supporting member 370 has insulation properties, is made of resin by molding, has a substantially U-shaped cross-section, and is in the form of a ring. A substantially U-shaped inner surface of the supporting member 370 covers the outer periphery of the first invertible plate 330, the outer periphery of the second invertible plate 342, the outer periphery of the O-ring 371, and the outer peripheries of the inner portions 320 and 350, and causes these members to be joined on top of each other in a stacked manner to be held together. The supporting member 360 is a caulking member made of stainless steel, and ensures sealing and holding by covering an outer surface of the supporting member 370.

The first invertible plate 330 and the second invertible plate 342 are each composed of a thin plate, e.g. a diaphragm made of metal, and are both fixed by the supporting member 370 at their outer peripheries, and are both sealed relative to the space where the electrode assembly 6 is present within the casing 4. The first invertible plate 330 has a central part 330a and a peripheral part 330b, and the second invertible plate 342 has a central part 342a and a peripheral part 342b. The central parts 330a and 342a are each in the shape of a disc that is substantially parallel to the z-axis. The peripheral parts 330b and 342b are in the shapes of curved surfaces that surround the central parts 330a and 342a, respectively. The central part 342a of the second invertible plate 342 is provided with a protruding portion 343 protruding toward the inner portion 320. The protruding portion 343 has a cylindrical shape, and a surface of the protruding portion 343 that faces the inner portion 320 is covered with an insulating member 344.

The inner portion 320 has a central part 320a and a peripheral part 320b, and the inner portion 350 has a central part 350a and a peripheral part 350b. The central parts 320a and 350a are thinly formed, and the peripheral parts 320b and 350b become gradually thinner toward the central parts 320a and 350a, respectively. As just described, the inner portion 320 and the inner portion 350 have depressed portions that are depressed upward as a whole, thereby forming a space for the first invertible plate 330 and the second invertible plate 342 to be inverted.

The first invertible plate 330 is electrically connected to the inner portion 350 by forming a joint with the inner portion 350 at the outer edge of the peripheral part 330b of the first invertible plate 330, and is joined to the inner portion 320 at the joint part 333 of the central part 330a of the first invertible plate 330 and fixed to the inner portion 320 by welding. The outer edge of the peripheral part 330b and the inner portion 320 are insulated from each other by the O-ring 371. The first invertible plate 330 and the inner portion 320 are electrically connected to each other only at the joint part 333. On the inside of the current interruption device 340, the positive electrode side conductive path is connected by the inner portion 350, the first invertible plate 330, and the inner portion 320, which are connected in series in this order. The second invertible plate 342 is electrically connected to, or may not be electrically connected to, the inner portion 320 by forming a joint with the inner portion 320 at the outer edge of the peripheral part 342b of the second invertible plate 342.

The joint part 333 is located above the protruding portion 343 of the second invertible plate 342, and an engraved portion 322 is formed in a lower surface of the central part 320a that is located below the area around the joint part 333. The central part 320a is thin at the engraved portion 322 so as to be easily broken.

Figure 8:
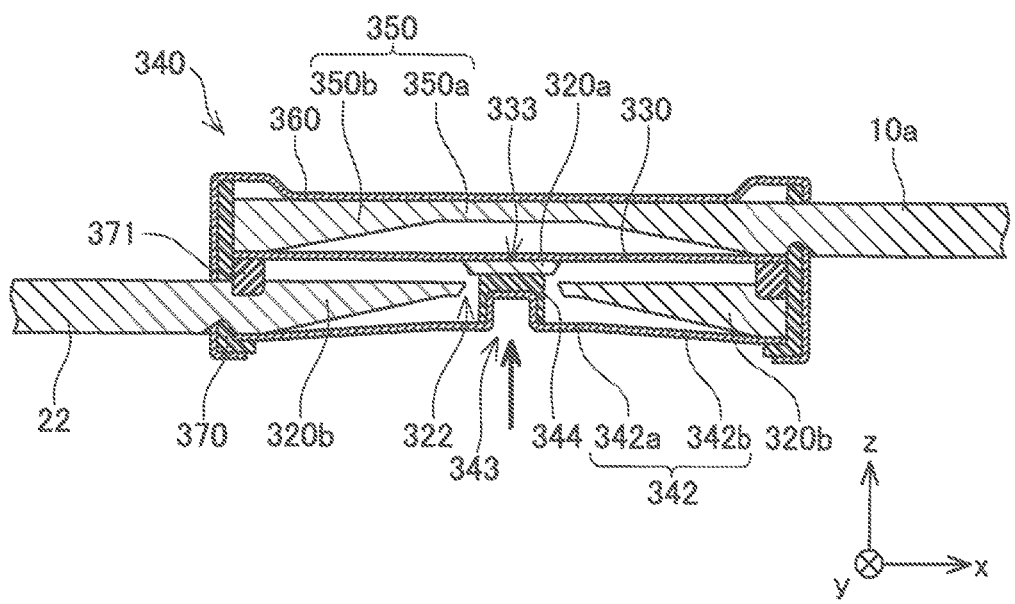
FIG. 8 is a diagram showing the current interruption device according to the modification and the area therearound in a state where the electric storage device is overcharged.

A rise in the pressure inside the casing 4 causes the pressure on the upper surface of the second invertible plate 342 to be negative with respect to the pressure on the lower surface of the second invertible plate 342. When the difference between the pressure on the upper surface of the second invertible plate 342 and the pressure on the lower surface of the second invertible plate 342 takes on a value that is equal to or larger than a predetermined value, the second invertible plate 342 is inverted in the direction of the z-axis so that the protruding portion 343 moves toward the central part 320a as shown in FIG. 8. The protruding portion 343 comes into contact with the lower surface of the central part 320a via the insulating member 344 to apply a load. This causes the central part 320a to be broken at the engraved portion 322 so that the portion forming a joint with the joint part 333 is separated from the inner portion 320 and, furthermore, the first invertible plate 330 is inverted to be separated from the inner portion 320. Since the first invertible plate 330 and the inner portion 320 are electrically connected only at the joint part 333 during the normal operation of the electric storage device 2 as shown in FIG. 7, the conduction between the first invertible plate 330 and the inner portion 320 is interrupted when, as shown in FIG. 8, the portion forming a joint with the joint part 333 is separated from the inner portion 320 and the first invertible plate 330 is separated from the inner portion 320. As a result, the electrical connection between the first conductive member 10a and the second conductive member 22 is interrupted, so that the positive electrode side conductive path is interrupted.

Figure 9:
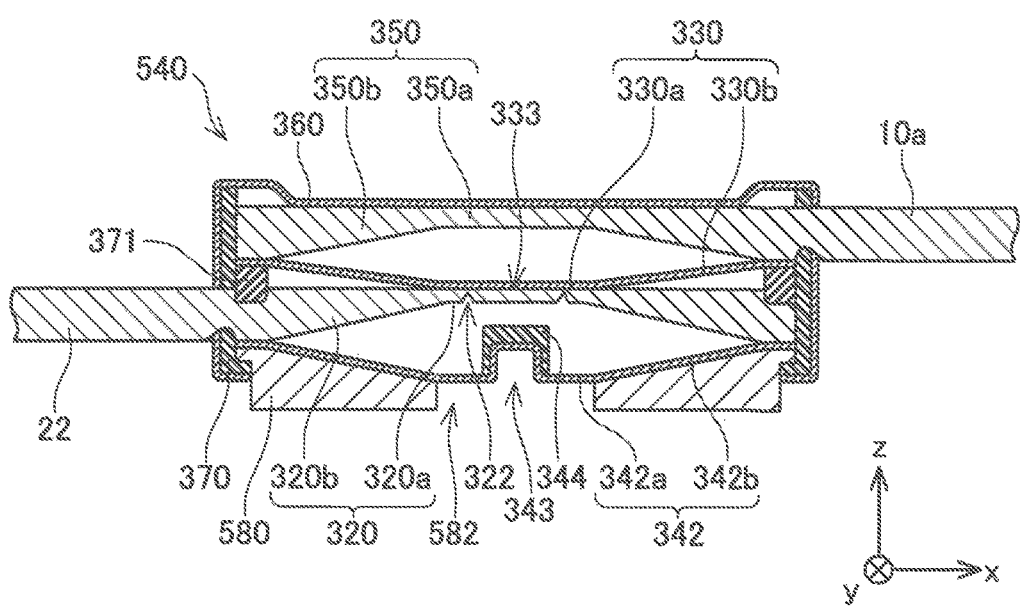
FIG. 9 is a diagram showing a current interruption device according to the modification and its vicinity in a state where the electric storage device is normally operating.

Further, such a current interruption device 540 as that shown in FIG. 9 may be used instead of the current interruption devices 140, 240, and 340. The current interruption device 540 differs from the current interruption device 340 in that the current interruption device 540 includes a protective plate 570. The other components of the current interruption device 540 are identical to those of the current interruption device 340, and as such, are given the same reference numerals and are not described below. As shown in FIG. 9, the current interruption device 540 has an insulating protective plate 580 provided below the second invertible plate 342. The protective plate 580 is supported by supporting members 360 and 370 together with the first invertible plate 330, the second invertible plate 342, the O-ring 371, and the inner portions 320 and 350. The protective plate 580 is disposed between the second invertible plate 342 and the electrode assembly 6 (see FIG. 1). Therefore, even if the electrode assembly 6 makes contact with the current interruption device 540, the second invertible plate 342 is prevented from malfunctioning. When the pressure inside the casing 4 is lower than a predetermined level, the conductive path between the electrode assembly 6 and the negative electrode terminal 12b are prevented from being interrupted. Further, since the protective plate 580 has insulation properties, the protective plate 580 prevents the second invertible plate 342 and the electrode assembly 6 from making contact with each other to form a short circuit. The protective plate 580 is provided with a through-hole 582. This prevents pressure from being applied to the protruding portion 343 of the second invertible plate 342 when the pressure inside the casing 4 rises beyond the predetermined level.

Further, in the embodiments described above, the current interruption devices 140, 240, 340, and 540 are each embodied by using, as a deformable plate, an invertible plate that is inverted when the pressure in the casing rises. However, this does not imply any limitation. The deformable plate needs only be one that, when the pressure inside the casing rises, deforms under the pressure to interrupt the conductive path.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. An electric storage device comprising:
a casing;
an electrode assembly accommodated within the casing, the electrode assembly including a positive electrode and a negative electrode;
an electrode terminal provided on a terminal attachment wall of the casing;
a conductive member accommodated within the casing and electrically connected to the electrode assembly; and
a current interruption device accommodated within the casing, connected in series to the conductive member, and configured to connect or interrupt a conductive path from the electrode assembly to the electrode terminal,
wherein
the electrode assembly comprises a tab protruding from at least one of the positive electrode and the negative electrode toward the terminal attachment wall,
the conductive member and the current interruption device are disposed between the terminal attachment wall and the electrode assembly,
the tab and the current interruption device at least partially overlap each other seen from a direction in which the conductive member extends.

2. The electric storage device according to claim 1, wherein
the conductive member linearly extends along the terminal attachment wall.

3. The electric storage device according to claim 1, wherein
the terminal attachment wall is provided with a plate-like insulating member that is in contact with an inner surface of the terminal attachment wall in parallel to the inner surface.

4. The electric storage device according to claim 1, wherein
the tab is bent in a direction substantially parallel to the terminal attachment wall so that a flat part that is substantially parallel to the terminal attachment wall is formed, and
the conductive member is joined to a surface of the flat part that faces the terminal attachment wall.

5. The electric storage device according to claim 1, wherein
the electric storage device is a secondary battery.

* * * * *